United States Patent [19]

Klenk

[11] Patent Number: 5,023,794

[45] Date of Patent: Jun. 11, 1991

[54] METHOD AND APPARATUS FOR AN INTERNAL COMBUSTION ENGINE WITH LEARNING CLOSED-LOOP CONTROL

[75] Inventor: Martin Klenk, Backnang, Fed. Rep. of Germany

[73] Assignee: Robert Bosch GmbH, Stuttgart, Fed. Rep. of Germany

[21] Appl. No.: 445,704

[22] PCT Filed: Mar. 4, 1989

[86] PCT No.: PCT/DE88/00138

§ 371 Date: Nov. 28, 1989

§ 102(e) Date: Nov. 28, 1989

[87] PCT Pub. No.: WO89/09331

PCT Pub. Date: Oct. 5, 1989

[30] Foreign Application Priority Data

Apr. 2, 1988 [DE] Fed. Rep. of Germany ....... 3811263

[51] Int. Cl.[5] .......................... G06F 15/48; G06G 7/70; F02M 51/00; F02P 5/00

[52] U.S. Cl. .......................... 364/431.04; 364/431.05; 364/431.12; 123/486; 123/489; 123/416

[58] Field of Search ...................... 364/431.03, 431.04, 364/431.05, 431.12; 123/416, 417, 440, 480, 486–489

[56] References Cited

U.S. PATENT DOCUMENTS

| | | | |
|---|---|---|---|
| 4,552,115 | 11/1985 | Okino | 123/489 |
| 4,715,344 | 12/1987 | Tomisawa | 123/489 |
| 4,768,490 | 9/1988 | Heck et al. | 123/489 |
| 4,879,656 | 11/1989 | Quigley et al. | 364/431.05 |
| 4,932,376 | 6/1990 | Linder et al. | 123/416 X |

OTHER PUBLICATIONS

SAE Paper #860594, "Development of a High-Speed High-Precision Learning Control System for the Engine Control", Tomisawa et al.

*Primary Examiner*—Parshotam S. Lall
*Assistant Examiner*—E. J. Pipala
*Attorney, Agent, or Firm*—Walter Ottesen

[57] ABSTRACT

An adaptation value memory is used for a learning control method having precontrol for an internal combustion engine and a corresponding apparatus. The adaptation value memory has a predetermined number of support points which are addressable via data records of values of address operating values. A learning operation is initiated if a support point region is left during operation of the internal combustion engine and if steady state operation was present therebefore. The adaptation value of the above-mentioned support point is changed by the learning operation when a control means issues an actuating variable which deviates from a desired actuating variable. The actuating variable deviation is not applied in full strength, instead, it is applied attenuated to change the old adaptation value. This is performed by means of an attenuation means which, as main function groups, has a learning intensity table 26, a counter read memory 27 and a counter difference table 28. The counter read memory stores the number of already completed learning cases for each support point. The learning intensity table issues a learning intensity value in dependence upon counter reading and the value of the actuating variable deviation. The counter reading is then changed, that is, for small actuating variable deviations, each time by "1", so long as a maximum value has not yet been reached.

6 Claims, 1 Drawing Sheet

METHOD AND APPARATUS FOR AN INTERNAL COMBUSTION ENGINE WITH LEARNING CLOSED-LOOP CONTROL

FIELD OF THE INVENTION

The invention relates to a learning control method having precontrol for an operating variable of an internal combustion engine wherein the operating variable is to be adjusted. The operating variable to be adjusted can, for example, be the fuel metering time duration, the ignition time point, the charging pressure, the exhaust gas feedback rate or even the idle speed. The invention furthermore relates to an apparatus for carrying out such a method.

BACKGROUND OF THE INVENTION

Such a method and the apparatus corresponding thereto are known from U.S. Pat. No. 4,827,937. The apparatus has precontrol means, desired value generating means, control means, attenuating means, learning condition recognition means and a learning characteristic field. The precontrol means supplies a precontrol value for the operating variable to be adjusted in dependence upon values of other operating variables than that which is to be adjusted. The desired value generating means supplies a control variable desired value which is compared to a particular control variable actual value. The control means forms an output value in dependence upon the difference between the two mentioned values by means of which the particular precontrol value is corrected in a controlled manner. The precontrol value is however also corrected in a controlled manner with the aid of an adaptation value read out of the learning characteristic field. The learning characteristic field stores adaptation values addressable via values of the address operating variables. For correcting the precontrol values, the learning characteristic field reads out that adaptation value which belongs to the available data record of values of the address operating variables. The adaptation values are always newly determined and always then when the learn condition recognition means issues a learn signal for a particular adaptation value when a predetermined learn condition is fulfilled. The correction occurs with the aid of the output value supplied with the aid of the control means and which is not directly applied for the correction; instead, only after multiplication with a learn intensity factor delivered by the attenuation means.

A learn characteristic field whose support point values are changed with the aid of attenuated values of an actuating variable at the entry of a learn condition is disclosed also in the SAE paper No. 860594, 1986, for an arrangement for adjusting the injection time. With this apparatus, the attenuation means does not continuously give out the same learn intensity value; instead, this value is dependent upon how often learning has taken place at a support point and how large the particular actuating variable is. In order to supply the variable learning intensity values which are factors, the attenuation means includes a counter reading memory and a learn intensity table. In the counter reading memory, a counter reading is stored for each support point of the characteristic field with the support points being identical with those of the learn characteristic field. The reading is increased by 1 up to a 16-bit value with each new learn cycle for each affected support point. However, if the output value for this support point is greater than a threshold value in three sequential learn cycles, the counter reading is reset to 0 for this support point. A learn intensity factor is read out from the learn intensity table in dependence upon the particular counter reading and in dependence upon the particular value of the actuating variable with the learn intensity factor being fixedly predetermined for these address values. The actuating variable is multiplied by this learn intensity factor and the result is added to the previously available support point value.

It has been shown that the system tends to relatively few oscillations when working with a single learn intensity value. The precondition applies however that the value is not set too high. Otherwise, the problem is present that the learning cannot take place with adequate speed if large values of the actuating variable are present.

The invention solves the problem of providing an arrangement for learning control having precontrol for an operating variable of an internal combustion engine which variable is to be adjusted and wherein rapid learning advances are obtained in a learning characteristic field without the control system tending toward oscillations. The invention further solves the problem of providing an apparatus for carrying out such a method.

The method according to the invention is distinguished in that the counter reading in the counter reading memory must no longer be incremented by the value 1 with each learning operation and after three unsatisfactory learning cycles be reset to 0; instead, a counter difference table is provided which stores counter differences in dependence upon the control actuating variable, that is the control deviation, and the already learned advance, that is, the counter reading in the counter reading memory. With these counter differences, the counter reading for a particular operating point in the counter reading memory is incremented or decremented.

According to another embodiment of the invention, the arrangement includes the means already described, that is: precontrol means, desired value generating means, control means, attenuating means which includes a counter reading characteristic field and a learn intensity table, learning condition recognition means and a learning characteristic field. In addition, the arrangement according to the invention includes a counter difference table as part of the attenuating means. This counter difference table stores counter difference values which are addressable via values of counter readings and a quantity dependent upon actuating variables. For each data record of particular values of the counter reading which are present and the quantity dependent upon actuating variables, the arrangement issues the corresponding counter difference value to the counter reading characteristic field to change the counter reading at the particular support point by the counter difference value.

The counter difference table does not increase the counter reading for the particular support point by the fixed value 1 for each learn cycle as in the system according to the above-mentioned SAE-paper; instead, the counter difference is configured so as to be variable. Accordingly, the counter difference value amounts to "+1" only for small values of the actuating variable and small counter difference values. For larger deviations, the difference becomes smaller and passes through the value "0" to negative values. Furthermore, the counter reading values in the counter reading characteristic field are limited to a maximum value. The effect of this measure is the following.

If repeated learning takes place at a support point because of relatively small values of the quantity dependent upon actuating variables, the maximum value for the counter reading is finally reached. This leads to a relatively low learn intensity value whereby the fact is considered that at a point at which already much has been learned, the probability for further large changes is small. If however a large value of the actuating variable dependent quantity occurs for this support point, this means that there is indeed a requirement for a larger learning advance. The counter reading is therefore lowered by several points which leads to an increase in the learn intensity value. The increase is however not so intense as it would be if the counter reading had been reset to 0. This makes evident that the method is variable with reference to the learning speed; however, there is no tendency toward oscillations since no large jump-like changes in the learn intensity values occur.

This advantageous effect can still be supported by a delay step which according to an advantageous development can be introduced additionally. This delay step delays the change of a counter reading in the counter reading characteristic field so long until, after the appearance of a learn signal, first a learn intensity value is read out of the learn intensity table because of the counter reading which is applied before the appearance of the learn signal. If a larger value of the actuating variable dependent quantity occurs, which leads to a relatively intense reduction of the counter reading and thereby to a relatively intense increase of the learn intensity value, the presently available large value of the actuating variable is not attenuated with the new learn intensity value which would lead to a high learn intensity; instead, the large value of the actuating variable is only attenuated with the old learn intensity value which leads to lesser learn intensity. If then no large values of the actuating variable occur any longer for this support point, that is, it appears that a one-time intense deviation case was present, these small values do not lead to too great a change by means of the learning step notwithstanding the increased learn intensity value. If in contrast, the large value of the actuating variable occurs once again or several times again, this is an indication that further large learn steps are required even though at this location much learning has taken place. These learn steps are then also carried out because the new large value of the actuating variable is now attenuated by the learn intensity value increased pursuant to the previous learning step which leads to increased learning intensity. Accordingly, the delay step provides that large learning values are only then issued if large values of actuating variables occur multiple times sequentially. Attention is called to the fact that in the above the statement "large learn intensity value" always means that this value leads to a great learning advance, that is, the value of the actuating variable is only less attenuated than a "small learn intensity value".

As already mentioned, the method of the invention can be used for adjusting the most different operating quantities of an internal combustion engine. However, the application is especially advantageous for adjusting the fuel metering time, especially the injection time. This is so because for systems for adjusting this quantity as control variable, the lambda value is used which is measured in the exhaust gas of the internal combustion engine and which is associated with a considerable dead time between the initiation of a change and the measurement thereof. Such systems tend especially toward oscillations because of the mentioned dead time and the oscillation attenuating measures according to the invention are especially useful.

BRIEF DESCRIPTION OF THE DRAWING

The invention will be explained in greater detail in the following with respect to the embodiments shown in the figures. The following are shown.

DESCRIPTION OF THE PREFERRED EMBODIMENTS OF THE INVENTION

Figure 1:
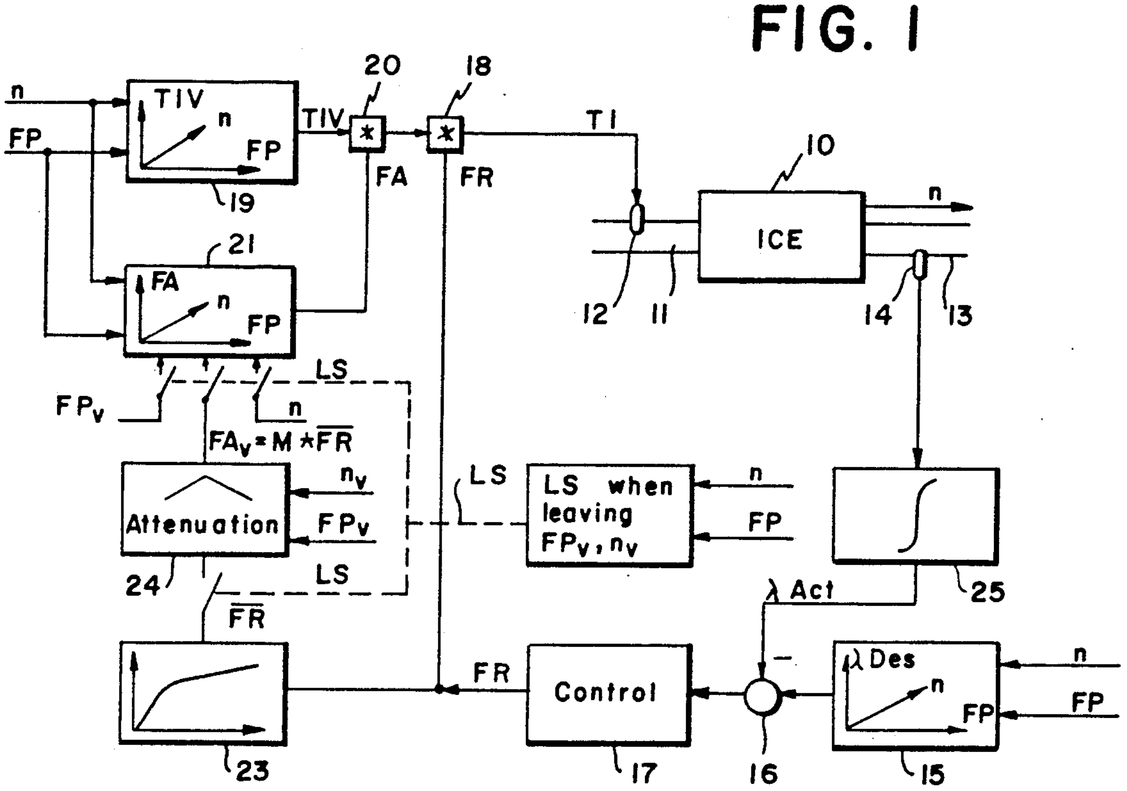
FIG. 1 is a function diagram of a learning precontrol/control method for adjusting the injection time with the function diagram being illustrated as a block diagram; and, FIG. 2 is a function diagram of attenuation means within the function diagram of FIG. 1 with the function diagram being shown as a block diagram.
Figure 2:
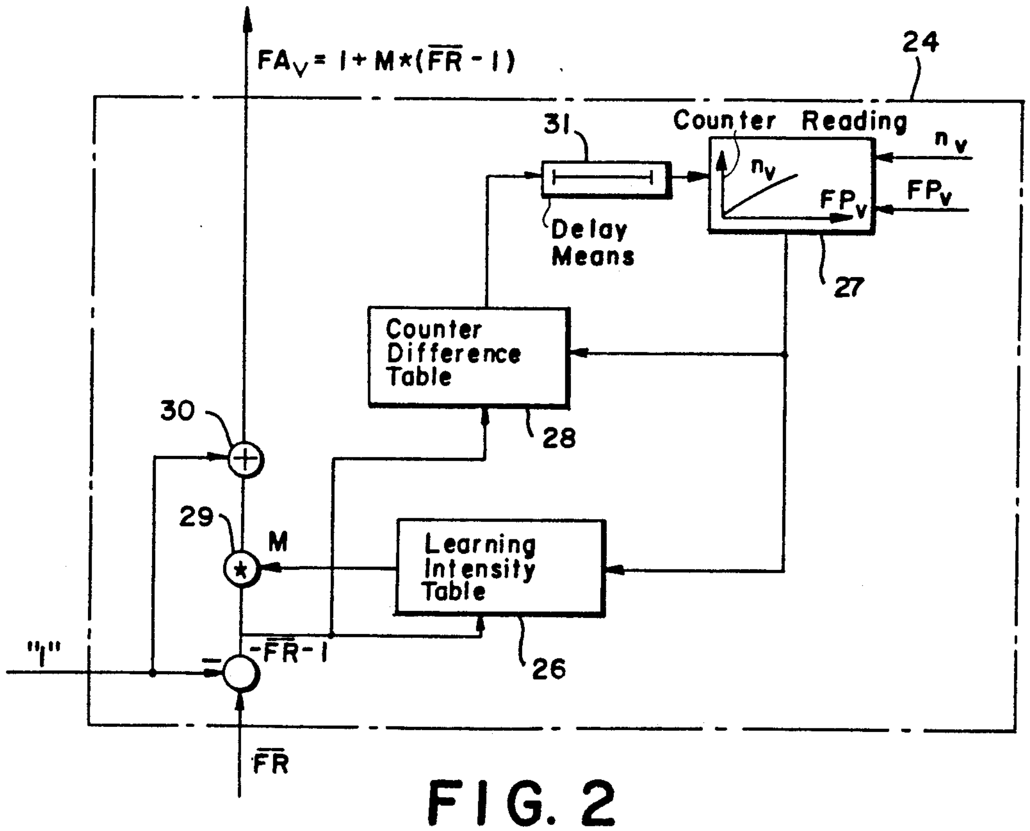

FIGS. 1 and 2 relate to a single embodiment. This embodiment relates to the adjustment of the injection time for an injection valve of an internal combustion engine 10. The adjustment of the injection time was selected as an example since the invention can be especially well described with respect thereto. Likewise only for reasons of explanation, the illustration in the form of a block diagram is selected. The function which is explained with the aid of the block diagrams is in practice carried out by means of a microcomputer as is conventional in the electronics of a motor vehicle.

An injection valve 12 is arranged in the intake pipe 11 of the internal combustion engine 10 and is controlled via a signal for the injection time TI. The lambda value adjusts itself in dependence upon the injected fuel quantity and the quantity of air drawn in by suction. The lambda value is measured by a lambda probe 14 mounted in the exhaust gas channel 13 of the internal combustion engine 10. The measured lambda actual value is compared with a lambda desired value supplied by desired value generator means 15 in the comparison step 16 and the control deviation value formed is supplied to a control means 17 having an integrated performance and which supplies an actuating variable which, in the case of the injection time control, has the character of a control factor FR. With this control factor, a predetermined injection time is modified by multiplication in a control multiplier step 18. A precontrol value TIV for the injection time is provided at the input of the system so that the system can operate during changes in the operating condition without control deviations which are too great. The precontrol value TIV is supplied by precontrol means which is realized in the illustrated embodiment by a precontrol memory 19 which is addressable via values of the speed n and of the position of the accelerator pedal FP and which stores precontrol values TIV.

The precontrol values TIV are fixed for specific operating conditions and specific system characteristics. However, the operating conditions such as air pressure or system characteristics such as air leakage characteristics or the closure time of the injection valve 12 change during operation of the internal combustion engine. In order to continuously obtain a best possible precontrol value notwithstanding these changes, the precontrol value read out of the precontrol memory 19 is modified by an adaptation factor FA in an adaptation multiplication step 20. The adaptation factor FA is read out of an adaptation factor memory 21 which has correspondingly as many support points as the precontrol memory 19 and as this memory 19 is addressable via data records of values of rotational speed n and the accelerator pedal position FP. We are concerned here with, for example, 64 support points having 8 addresses for classes of rotational speed values and 8 addresses for classes of accelerator pedal positions.

The adaptation factors at the 64 support points are all set to the value "1" during initiation of operation. A region is predetermined about each support point. If this region is left and if the internal combustion engine 10 was previously in steady state operation, a learn condition recognition means 22 issues a learn signal LS. This learn signal LS leads to a subsequent change of the adaptation factor of the support point which is given by the coordinates nv, FPv wherein the concern here is with the values of the address operating quantities for the time point of leaving the region.

Averaging means 23 and an attenuation means 24 are provided for carrying out the learning step. The averaging means 23 is of importance especially in connection with a control to lambda=1 since in this case, the control factor FR carries out system-dependent oscillations. With correct precontrol, this average value must be "1". If the control factor FR deviates from this middle value, for example if it is "1.1", the precontrol must be improved by determining a new adaptation factor FA for the particular support point. It is then obvious to write into the adaptation factor memory 21 the determined average value of the control factor, that is 1.1 in the example, as a new adaptation factor for the support point which has just been left at the occurrence of the learn signal LS for this support point. However, it has been shown that it is more advantageous not to take over the averaged value of the control factor in full value, and instead, to take the averaged value of the control factor over only attenuated which occurs by multiplication by a learn intensity factor <1 in the attenuation means 24.

In the function described up to now, the system is identical to that described in U.S. Pat. No. 4,827,937 with reference to FIG. 11. The decisive difference is that with the known method, the attenuation means 24 continuously issues the same learn intensity factor; whereas, the attenuation means of the present method issues a variable learn intensity factor which will be explained in greater detail below with respect to FIG. 2.

However, before this decisive difference can be treated, further differences to the mentioned figure in the application referred to should be pointed out. In the known embodiment, the desired-value generating means 15 and the comparison step 16 are not present and an integration step 25 between the lambda probe 14 and the comparison step 16 is also not present. These function groups are contained in the known system in the control means 17 since there the premise is a continuously constant lambda desired value of 1. The function groups are separately drawn in the instant case to illustrate that the lambda desired value can also be variable which is the case for an application of lean lambda control. A further difference to the known embodiment is that there also function groups for adjusting a global adaptation factor are shown. These function groups can also be utilized in the present system if a global factor is to be worked in. For the invention discussed here, namely the type of variable configuration of the learn intensity factor M, these details are however insignificant.

As shown in FIG. 2, the attenuation means 24 has three main function groups, namely a learn intensity table 26, a counter reading memory 27 and a counter difference table 28. All three function groups define characteristic fields from which values can be read out which are assigned to data records of values of addressable quantities. The address quantities are however different and for this reason also different terms for the function groups were used. The counter reading memory 27 is addressable via values of rotational speed n and the accelerator pedal position FP as are the precontrol memory 29 and the adaptation factor memory 21. In all three memories the same class segmentation is present, for example, in 8×8 support points. The characteristic fields of the two tables, that is the learn intensity table 26 and the counter difference table 28, are instead addressed via values of the percent actuating variable deviation and of the counter reading issued by the counter reading memory 27 for the particular support point. The classification of these quantities is absolutely independent of the classification of the other quantities which serve to address the mentioned memories. According to table I for the learn intensity table and table II for the counter difference table (see end of the description) are however likewise subdivided in 8×8 support points for a practical embodiment because this is offered because of the conventional address method. This segmentation however has nothing to do with the 8×8 segmentation of the memory and could therefore be any other segmentation.

As already mentioned and apparent also from the mentioned tables, an address quantity for the learn intensity table 26 and the counter difference table 28 is the percent actuating variable deviation. This deviation is formed from the averaged control factor $\overline{FR}$ in that the value "1" is subtracted from this average value and the difference is computed as a percent value referred to the value "1". If an averaged actuating variable now occurs, that is, an averaged control factor of again "1.1" as in the example above, and if this is applicable for a support point for which no learn cycle has been carried out, that is for which a counter reading "0" is stored in the counter reading memory 27, the learn intensity table issues the learn intensity factor "1" as apparent from table I. This learn intensity factor M is multiplied in an attenuation-multiplier step 29 by the absolute actuating variable deviation, that is the difference of the averaged actuating variable $\overline{FR}$ and the desired value "1" and, in order to obtain a preliminary adaptation factor FAv, the desired value "1" is added in the addition step 30 so that finally the value "1.1" is obtained. With this value, the old adaptation factor FA, that is "1", is multiplied whereby the new adaptation factor "1.1" is obtained.

If the region about the same support point is approached still three further times and then again left with steady state operation present beforehand, then the counter reading for this support point will be at the value "4" and the adaptation factor FA can be assumed to be at the value "1.2". If when leaving the fourth time, an average actuating variable of "1.1" is present, that is an increase of 10%, this leads to a learn intensity factor of 0.9 as can be seen from the learn intensity table according to table I. With this value, the absolute actuating variable difference value "0.1" already mentioned above is multiplied whereby the value 0.09 results to which again the desired value "1" is added in the addition step 30, whereby now the temporary adaptation factor FAv "1.09" is obtained. This adaptation factor multiplied by the old adaptation factor of "1.2" results in the new adaptation factor 1.2×1.09, that is "1.308" for the support point which has just been left.

If the same support point is again approached 24 further times with the actuating variable deviation however amounting to only approximately 2%, the counter reading for this support point is increased each time by "1" which results from the counter difference table according to table II, that is, up to the value "28". If this support point is now approached one further time and again left, but now with an actuating variable deviation of 15%, the learn intensity factor "0.4" is read out as can be taken from table I. For this support point then results 1+0.4×(1.1−1) for the multiplication by the old adaptation factor FA in the adaptation factor memory 21. After this value is read out, the counter reading for the particular support point is reduced by "4" as can be seen by the value "−4" from the table II for 15% actuating variable deviation and the counter reading 28. The counter reading for the support point which has been considered continuously then amounts to "24". The fact that the readout from the learn intensity table 26 first occurs still pursuant to the old counter reading and only then the counter reading to the counter reading memory 27 is corrected for the corresponding support point is shown in accordance with the function diagram according to FIG. 2 by means of a delay step 31 between the counter difference table 28 and the counter reading memory 27.

The mentioned delay has the advantage that a large actuating variable deviation is first multiplied only by a learning intensity factor which transmits the deviation further greatly attenuated. If thereafter again only small actuating variable deviations occur, the counter reading is increased to "28" so that the small learning intensity factor is again applicable. In this way, a one-time larger deviation has hardly been effective. If such a deviation does however again occur, the deviation is transmitted with greater intensity than the first time since now the counter reading is reduced and the learning intensity factor is thereby increased. This fact that one-time larger deviations are hardly considered leads to greatly reduced oscillating tendency of the system.

The method and the apparatus of the embodiment can be varied in many ways. For example, the precontrol means need not be realized by means of a precontrol memory 19; instead, a precontrol value can be obtained in any desired manner, for example by means of quotient formation from the air mass and the rotational speed as described in the above-mentioned SAE paper. By changing an adaptation factor for a support point, the adaptation factors of adjacent support points can be changed at the same time as thoroughly described for example in U.S. Pat. No. 4,676,215. It is not necessary that a separate adaptation factor memory be provided; instead, it is also possible to read in values from a precontrol-ROM into a RAM and then directly modify the precontrol values as described for example in BG 2 034 930 B. Furthermore, as described above, a global factor can also be determined.

In the embodiment described, the premise is taken that all logic operations occur multiplicatively. This is appropriate in arrangements for controlling the injection time. In contrast thereto, in arrangements for adjusting the ignition time points corrections are conventionally carried out additively. Such an arrangement is characterized in that: the operating variable to be adjusted is the ignition time point, the control variable is for example a torque indicating variable, the actuating variable is a control summand, the adaptation value is an adaptation summand and the learning intensity value is a learning summand with all summands being able to take on even negative values and the attenuation logic operation means has an adding step which additively corrects the adaptation values by means of the correction values.

It is also unimportant under which condition the learning signal LS is issued. The above-mentioned condition corresponds to that which is described, in both United States patents referred to above. The also already mentioned SAE paper recites as a condition that for a control to lambda=1 with a two-step controller a reversal of the control direction has taken place at least twice. The learning signal can also be issued with each program cycle without an additional condition.

In the embodiment, the premise was taken that, for obtaining a new adaptation factor FA, the control factor FR is used as it is issued from the control means 17. This control factor FR contains typically a proportional component and an integral component. The integral component is the direct measure for the effort for eliminating a control deviation. If this integral component can be picked off separately from the control means 17, it is therefore an advantage to apply only this integral component of the control factor FR and not the total control factor for computing a new adaptation factor FA.

What is essential is alone the manner in which the learning intensity value is obtained for changing the adaptation value, namely, by making reference to a learning intensity table with the counter reading of a support point as an addressing variable with this counter reading being changeable up to a maximum value in dependence upon positive or negative values which can be read out of a counter difference table.

TABLE I

Learning Intensity Table

| Counter Reading | | | | | | | | |
|---|---|---|---|---|---|---|---|---|
| 28 | 0.100 | 0.150 | 0.200 | 0.250 | 0.300 | 0.350 | 0.400 | 0.500 |
| 24 | 0.200 | 0.250 | 0.300 | 0.350 | 0.400 | 0.450 | 0.500 | 0.600 |
| 20 | 0.300 | 0.350 | 0.400 | 0.450 | 0.500 | 0.550 | 0.600 | 0.700 |
| 16 | 0.400 | 0.450 | 0.500 | 0.550 | 0.600 | 0.650 | 0.700 | 0.800 |
| 12 | 0.500 | 0.550 | 0.600 | 0.650 | 0.700 | 0.750 | 0.800 | 0.900 |
| 8 | 0.600 | 0.650 | 0.700 | 0.750 | 0.800 | 0.850 | 0.900 | 0.950 |
| 4 | 0.700 | 0.750 | 0.800 | 0.850 | 0.900 | 0.950 | 1.000 | 1.000 |
| 0 | 0.800 | 0.850 | 0.900 | 0.950 | 1.000 | 1.000 | 1.000 | 1.000 |
| | 0.0 | 2.5 | 5.0 | 7.5 | 10.0 | 12.5 | 15.0 | 17.5% |
| | Actuating Variable Deviation | | | | | | | |

TABLE II

Counter Difference Table

| Counter Reading | | | | | | | | |
|---|---|---|---|---|---|---|---|---|
| 28 | +1 | +1 | 0 | −1 | −2 | −3 | −4 | −5 |
| 24 | +1 | +1 | +1 | 0 | −1 | −2 | −3 | −4 |
| 20 | +1 | +1 | +1 | +1 | 0 | −1 | −2 | −3 |
| 16 | +1 | +1 | +1 | +1 | +1 | 0 | −1 | −2 |
| 12 | +1 | +1 | +1 | +1 | +1 | +1 | 0 | −1 |
| 8 | +1 | +1 | +1 | +1 | +1 | +1 | +1 | 0 |
| 4 | +1 | +1 | +1 | +1 | +1 | +1 | +1 | +1 |
| 0 | +1 | +1 | +1 | +1 | +1 | +1 | +1 | +1 |
| | 0.0 | 2.5 | 5.0 | 7.5 | 10.0 | 12.5 | 15.0 | 17.5% |
| | Actuating Variable Deviation | | | | | | | |

I claim:

1. A method for learning control with precontrol for an operating variable of an internal combustion engine, the method comprising the steps of:

determining a precontrol value and correcting said precontrol value by means of an adaptation value and an output value with the adaptation values being formed from the desired values by means of logic operations utilizing corrective values;

storing counter values in a counter reading memory for a predetermined number of operating points, the counter values being a measure for the learning advancement at a particular operating point with the counter value being limited to a maximum value;

applying the counter reading from the counter reading memory and a value dependent on an actuating variable to a counter difference table and for these values, reading out a corresponding counter difference with which the counter reading is changed in the counter reading memory for the particular operating point;

applying a counter read value and a value dependent on an actuating variable to a learning intensity table and reading a corresponding learning intensity value out of the table in dependence upon the values applied;

logically combining the value dependent upon an actuating variable with the learning intensity value for forming the correction value; and, applying the correction value to control the internal combustion engine.

2. Apparatus for learning control with precontrol for an operating variable of an internal combustion engine wherein the variable is to be adjusted, the apparatus comprising:

precontrol means for issuing a precontrol value for the operating variable to be adjusted in dependence upon values of operating variables other than the variable to be adjusted;

desired value generating means for issuing a control variable desired value;

control means for forming an output value of an actuating variable in dependence upon the difference between the control variable desired value and the measured control variable actual value, the precontrol value being controllably corrected with said output value;

attenuation means for receiving the actuating variable and for issuing a correction value;

learning condition recognition means for issuing a learning signal when a predetermined learning condition is fulfilled;

an adaptation value memory for storing adaptation values which are addressable via values of address operating variables and for issuing that adaptation value for the controlling correction of the precontrol value which corresponds to the data record of values of the address operating variables with at least one adaptation value being corrected by means of the correction value when the learning condition recognition means issues the learning signal; and, said attenuation means including: a counter reading memory which is addressable in the same manner as the adaptation value memory and which stores a counter reading for each support point which is a measure for the learning advancement at this support point and which is limited to a maximum value; a learning intensity table which stores learning intensity values addressable via values of counter reading and an actuating variable dependent quantity and, for each data record of values of counter reading and mentioned quantity, issues the corresponding learning intensity value; logic operation means for attenuating the actuating variable dependent value with the learning intensity value for forming the correction value; and, a counter difference table which stores counter difference values addressable via values of counter reading and actuating variable dependent quantities and which issues the corresponding counter difference value to the counter reading characteristic field for a data record of values of counter reading and mentioned quantity for changing the counter reading at the particular support point by the counter difference value.

3. The apparatus of claim 2, wherein: the operating value to be adjusted is the fuel metering time, the control variable is the lambda value, the actuating variable is a control factor, the adaptation value is an adaptation factor and the learning intensity value is a learning factor, and the logic operation means includes a multiplication step which multiplicatively corrects the adaptation factors by means of the correction values.

4. The apparatus of claim 2, wherein: the operating variable to be adjusted is the ignition time point, the control variable is a torque indicating variable, the actuating variable is a control summand, the adaptation value is an adaptation summand and the learning intensity value is a learning summand, with all summands being capable of also taking on negative values; and, said logic operation means includes an adding step which additively corrects the adaptation values by means of the correction values.

5. The apparatus of claim 2, wherein: said learning condition recognition means issues a learning signal when a support point region of the adaptation value memory is left and when steady state operation was present therebefore.

6. The apparatus of claim 2, comprising delay means for changing a previous value in the counter reading memory into a new value only when there is confirmation that, for the readout of a value from the learning intensity table, the previous vale from the counter memory has been used, said change and said readout both being triggered by the occurrence of a learning signal.

* * * * *

UNITED STATES PATENT AND TRADEMARK OFFICE
CERTIFICATE OF CORRECTION

PATENT NO. : 5,023,794

DATED : June 11, 1991

INVENTOR(S) : Martin Klenk

It is certified that error appears in the above-identified patent and that said Letters Patent is hereby corrected as shown below:

On the title page, under reference numeral [86]: delete "PCT/DE88/00138" and substitute -- PCT/DE89/00138 -- therefor.

Column 10, line 56, delete "vale" and substitute --value--.

Signed and Sealed this

Twenty-second Day of June, 1993

Attest:

Michael K. Kirk

MICHAEL K. KIRK

*Attesting Officer* *Acting Commissioner of Patents and Trademarks*